United States Patent
Heine

[19]

[11] Patent Number: 6,158,500

[45] Date of Patent: *Dec. 12, 2000

[54] HEAT EXCHANGER ARRANGEMENT HAVING TWO HEAT EXCHANGERS AND METHOD OF MAKING SAME

[75] Inventor: Reinhard Heine, Remseck, Germany

[73] Assignee: Behr GmbH & Co., Stuttgart, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 09/112,145

[22] Filed: Jul. 9, 1998

[30] Foreign Application Priority Data

Jul. 12, 1997 [DE] Germany .............................. 297 12 351

[51] Int. Cl.[7] ....................................................... F28F 9/00

[52] U.S. Cl. ........................... 165/67; 165/140; 180/68.4; 248/232

[58] Field of Search .................... 165/67, 140; 180/68.4; 248/232

[56] References Cited

U.S. PATENT DOCUMENTS 5,139,080  8/1992  Bolten et al. .
5,657,817  8/1997  Heine et al. ............................... 165/67
5,785,115  7/1998  Laveran ..................................... 165/67

FOREIGN PATENT DOCUMENTS

| 3922814A1 | 4/1990 | Germany . |
| 3907926A1 | 9/1990 | Germany . |
| 3918176A1 | 12/1990 | Germany . |
| 4109284A1 | 9/1992 | Germany . |
| 4137038C1 | 6/1993 | Germany . |
| 9319025 | 3/1994 | Germany . |
| 4421835A1 | 1/1996 | Germany . |
| 4425350A1 | 1/1996 | Germany . |
| 4225253C2 | 12/1996 | Germany . |
| 29707571U1 | 8/1997 | Germany . |
| 405215483 | 8/1993 | Japan ..................................... 165/140 |
| 67832 | 1/1913 | Switzerland . |

*Primary Examiner*—Christopher Atkinson
*Attorney, Agent, or Firm*—Evenson, McKeown, Edwards & Lenahan, P.L.L.C.

[57] ABSTRACT

A heat exchanger assembly is provided which includes two heat exchangers connected by a detachable fastening arrangement. The fastening arrangement includes a pair of plug-type holding devices at one side of the heat exchangers and a pair of detent connections at another side of the heat exchangers. One of the detent connections is configured as a movable bearing permitting relating adjusting movement of the heat exchangers. The other detent connection is configured as a fixed bearing.

16 Claims, 5 Drawing Sheets

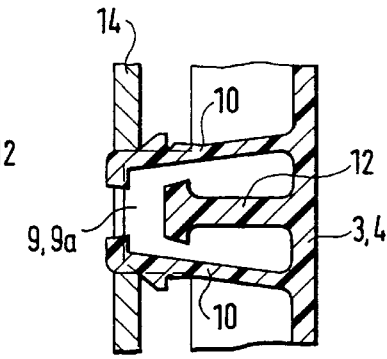
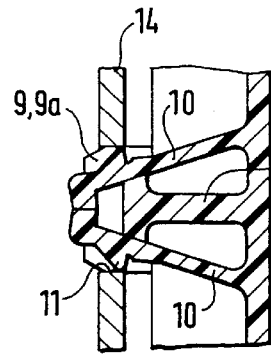
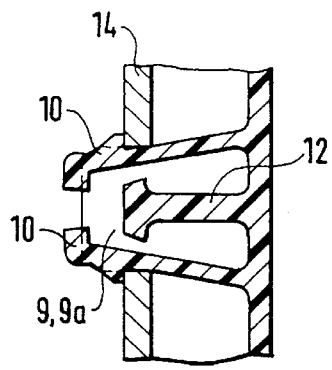
FIG. 5c     FIG. 5b     FIG. 5a
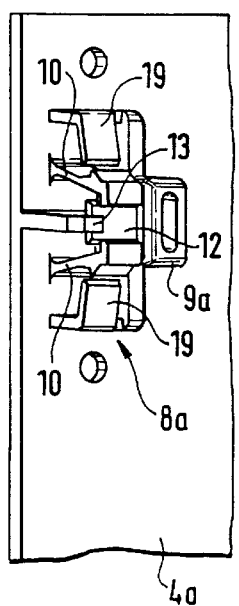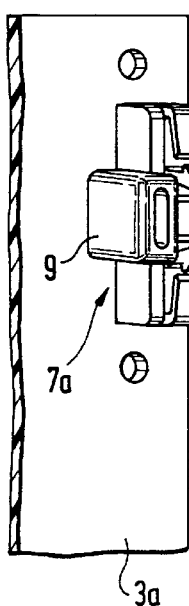    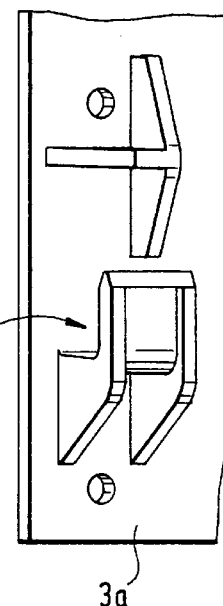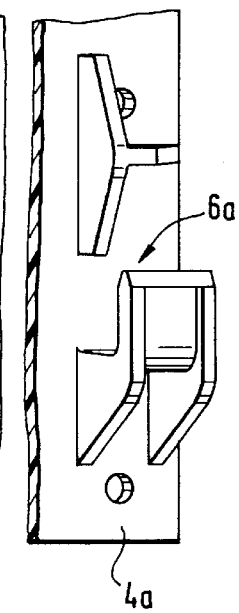
FIG. 6        FIG. 7

_

HEAT EXCHANGER ARRANGEMENT HAVING TWO HEAT EXCHANGERS AND METHOD OF MAKING SAME

BACKGROUND AND SUMMARY OF THE INVENTION

This application claims the priority of German application 297 12 351.3, filed in Germany on Jul. 12, 1997, the disclosure of which is expressly incorporated by reference herein.

The invention relates to a heat exchanger arrangement having two heat exchangers which can be detachably connected with one another on opposite fastening sides by means of a fastening arrangement, the fastening arrangement having a plug-type holding device with hook-type profiles on one fastening side.

Such a heat exchanger arrangement is known from German Patent Document DE 39 22 814 A1. In this case, a first heat exchanger in the form of a condenser is fastened to a second heat exchanger in the form of a cooler. For the fastening of the condenser, two hook-shaped holders are provided on the cooler on one side of the condenser into which a condenser is placed from above. On the opposite side, the condenser is provided with holding devices which are fastened to the cooler by means of screwed connections. The lower holders are therefore used as the plug-type holding device into which condenser is inserted and subsequently is screwed on its upper end area by means of the holding devices to the cooler.

It is an object of the invention to provide a heat exchanger arrangement of the initially mentioned type which ensures a simplified mutual connection of the two heat exchangers.

This object is achieved in that, on the other fastening side, the fastening arrangement has a detent connection which is divided into a detent arrangement constructed as a movable bearing and into a detent arrangement constructed as a fixed bearing. This creates an extremely simple connection between the two heat exchangers which does not require additional fastening elements, such as screwing elements or similar devices. By means of the construction as a fixed bearing and a movable bearing, a statically defined fastening of one heat exchanger on the other is created, in which case manufacturing tolerances can also be compensated.

As a further development of the invention, a force transducing device is assigned to each detent arrangement, which force transducing device has a support body arranged on one heat exchanger as well as at least one support web which is arranged on the other heat exchanger and reaches at least partially around the support body in the mounted condition of the heat exchangers. By means of the force transducing device, an additional form closure is achieved in the area of the detent arrangements which improves the stability of the connection between the two heat exchangers.

As a further development of the invention, each detent arrangement has an elastically resilient pair of detent hooks on one heat exchanger as well as at least one corresponding detent recess on the other-heat exchanger, in which case the detent hooks of each pair of detent hooks reach behind the edges of the at least one detent recess in the mounted condition. As a result, a secure and stable detent connection is created.

As a further development of the invention, at least one center web respectively used as a support is provided between the detent hooks of each pair of detent hooks for limiting the deflecting capacity of the detent hooks. As a result, an overloading of one or the other detent hook of the pair of detent hooks is avoided so that a failure of such a detent hook because of a breaking-off or similar damage can almost not occur.

As a further development of the invention, the plug-type holding devices as well as the detent connection are positioned in the area of opposite collecting tanks of one heat exchanger. This further development is advantageous if the heat exchangers have at least essentially the same widths dimensions or height dimensions.

In a further development of the invention, the collecting tanks are made of plastic and the portions of the plug-type holding arrangement assigned to the collecting tanks of the heat exchanger as well as the detent connection are shaped in one piece to the collecting tank. As the result, the fastening arrangement can be produced in a particularly operationally reliable manner and at reasonable cost.

As a further development of the invention, the detent arrangements and the assigned force transducing devices are positioned adjacent to one another, and, in a supplementary manner, the edges of the detent recesses are constructed as support webs of the force transducing devices. The edges of the detent recesses therefore have a double function because, on the one hand, they are used for fixing the detent hooks and, on the other hand, they are used for the laterally flanking support of the support bodies. This further development permits a particularly compact and space-saving construction of the fastening arrangement.

As a further development of the invention, the support bodies are provided with tapering centering points. This simplifies the mounting of one heat exchanger on the other heat exchanger.

Other objects, advantages and novel features of the present invention will become apparent from the following detailed description of the invention when considered in conjunction with the accompanying drawings.

BRIEF DESCRIPTION OF THE DRAWINGS

FIGS. 5a to 5c are various mounting steps of the function of the detent arrangements according to FIGS. 1 to 4;

FIG. 6 is a schematic view of another embodiment of a detent connection for fastening a first heat exchanger to a second heat exchanger;

FIG. 7 is a view of another plug-type holding device similar to FIG. 1 for fastening the side of one heat exchanger, which is opposite the detent connection according to FIG. 6, to the other heat exchanger;

DETAILED DESCRIPTION OF THE DRAWINGS

Figure 1:
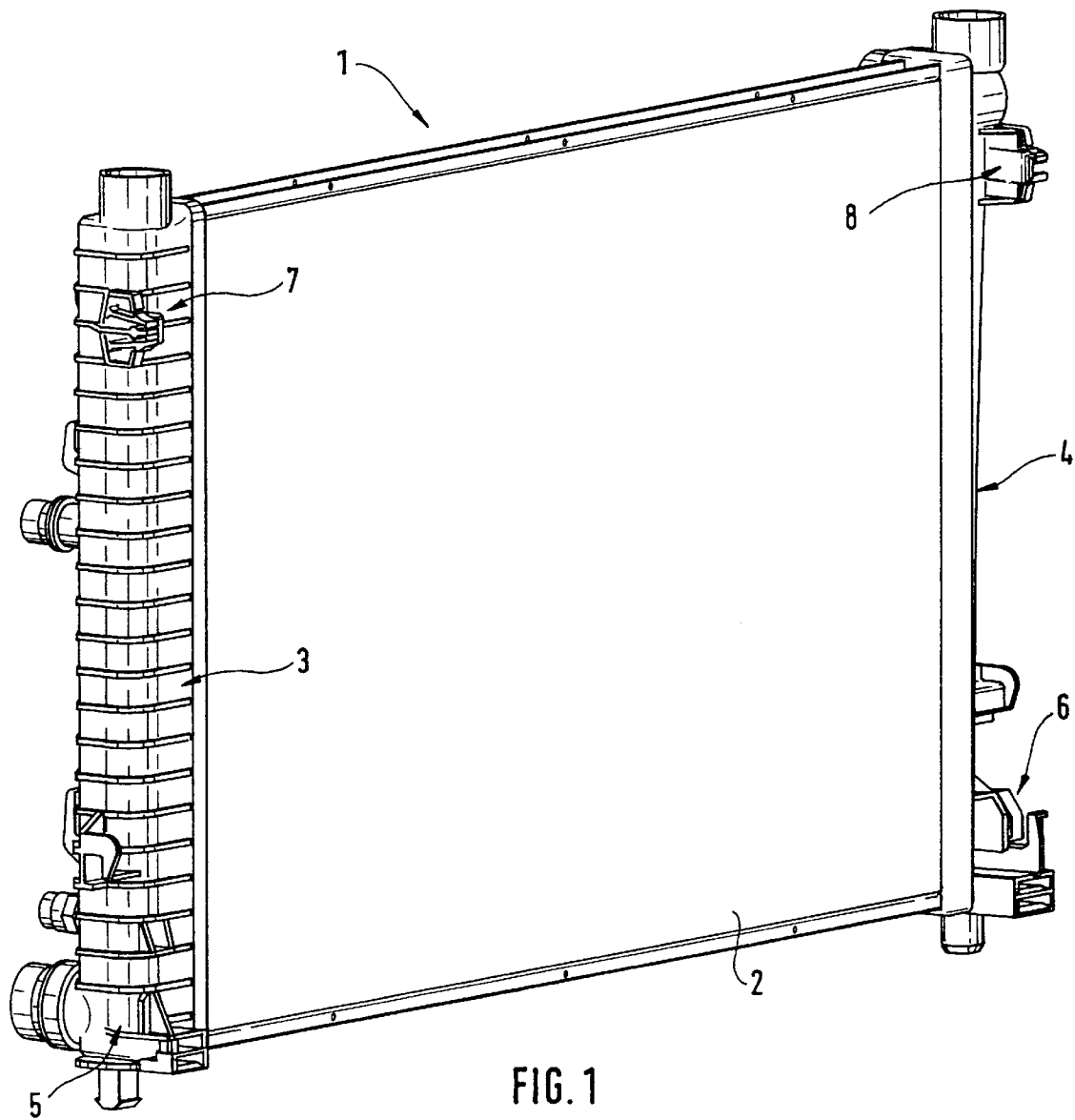
FIG. 1 is a perspective view of a heat exchanger constructed according to a preferred embodiment of the invention in the form of a coolant/air cooler on whose coolant tanks, which are also called collecting tanks, a plug-type holding device as well as a detent connection are provided for the fastening of a second heat exchanger.
Figure 4:
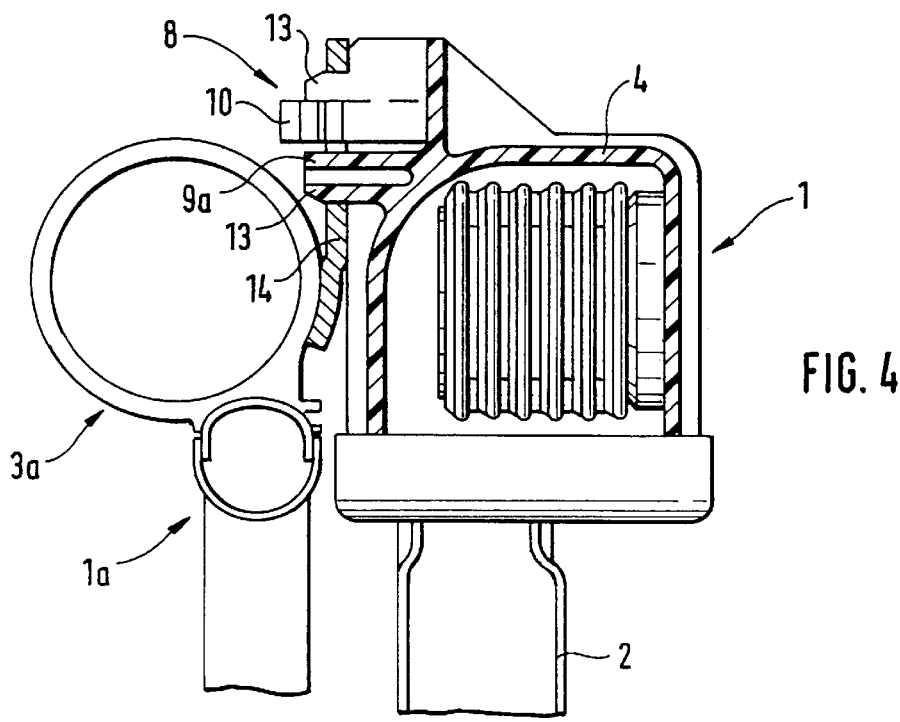
FIG. 4 is a schematic sectional view of a heat exchanger arrangement according to the invention at the level of a detent arrangement according to FIG. 3, a condenser being fixed on the cooler.
Figure 8:
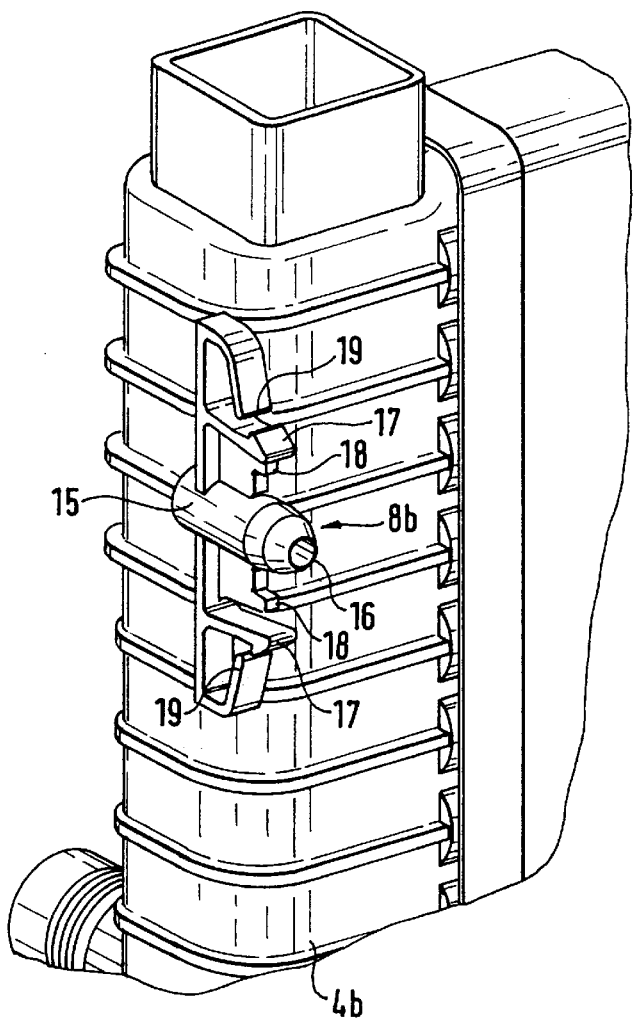
FIG. 8 is a view of another embodiment of a fastening arrangement in the area of a detent arrangement, which is constructed as a fixed bearing, on a coolant tank of a cooler.
Figure 9:
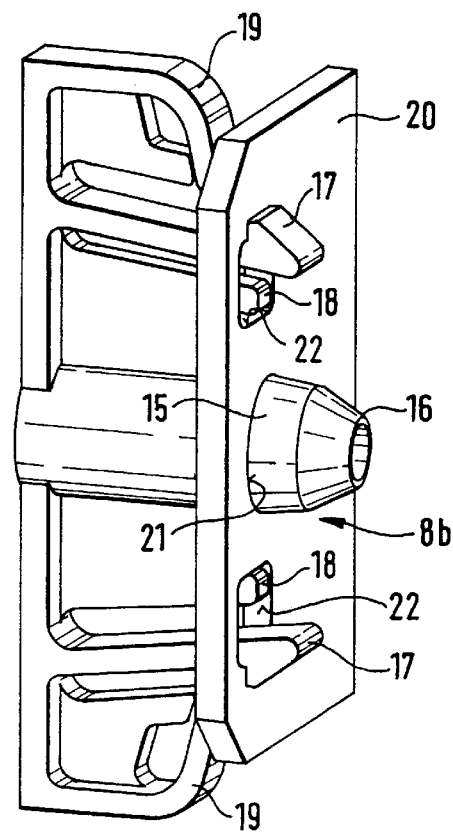
FIG. 9 is an enlarged perspective representation of the detent arrangement according to FIG. 8.

A heat exchanger 1 in the form of a coolant/air cooler, i.e. radiator is provided with a fastening arrangement in the manner described in detail in the following. This fastening arrangement permits the fastening of a second heat exchanger, preferably in the form of a condenser (FIG. 4) to the cooler 1. In a manner known per se, the cooler 1 has a finned tube block 2 which, in the representation according to FIG. 1, is bounded in the area of its top side as well as in the area of its bottom side by lateral parts which are not indicated in detail. Two coolant tanks 3, 4, which are each made of plastic, are placed on the opposite sides of the finned tube block 2. For fastening the condenser 1a to the cooler 1, the condenser 1a, in the area of a lower fastening side, is inserted in a plug-type holding device 5, 6 on the cooler 1, the plug-type holding device 5, 6 being constructed by two support hooks 5, 6 which are shaped to the two coolant tanks 3, 4 and are used as hook-type profiles. The two support hooks 5, 6 receive the bottom side of the condenser 1a such that it is held form-lockingly downward as well as horizontally away from the cooler 1 (relative to FIG. 1). The basic construction as well as the function of the plug-type holding device 5, 6 corresponds to the plug-type holding device which is described in German Patent Document DE 39 22 814 A1. In the case of the plug-type holding device according to FIG. 1 as well as according to FIG. 7, it is an important difference that the support hooks 5, 6; 5a, 6a are shaped in one piece to the respective coolant tank 3, 4; 3a, 4a. At a narrow distance above the plug-type holding device 5, 6 as well as the plug-type holding device 5a, 6a, supplementary positioning webs are provided which are not indicated in detail and which ensure a play-free holding of the underside of the condenser in the plug-type holding device 5, 6; 5a, 6a in the mounted condition of the condenser 1a on the cooler 1.

For mounting the condenser 1a in the area of its upper collecting tank 3a on the cooler 1, two stable fastening lugs 14 are fastened on the side of the two collecting tanks 3a which face the cooler 1, each collecting tank 3a being provided with one fastening lug 14 respectively acting as a holding plate. In the illustrated embodiment, the collecting tank 3a is made of metal. The fastening lugs 14 are brazed to the collecting tanks 3a. The two fastening lugs 14 are positioned at the level of the two upper fastening points 7, 8 in the area of the opposite coolant tanks 3, 4. According to FIG. 2 and 3, both fastening lugs 14 each have a detent recess 11 which is constructed as a rectangular opening and which can be brought into an operative connection with the two detent arrangements of the fastening points 7 and 8. Force transducing devices in the form of support bodies 9, 9a (FIGS. 2 and 3) are assigned to the two detent arrangements and each project as parallelepiped blocks from the two coolant tanks 3, 4 and are shaped to them in one piece. The detent arrangements which will be described in detail in the following are also shaped in one piece to the coolant tanks 3, 4. The support bodies 9, 9a are each arranged directly adjacent to the assigned detent arrangements. The two support bodies 9, 9a of the two force transducing devices have a height which corresponds to the height of the respective detent recess 11 so that the upper and lower longitudinal sides of the detent recesses 11 form-lockingly and supportingly flank the corresponding upper and lower lateral surfaces of the parallelepiped support bodies 9, 9a.

Figure 2:
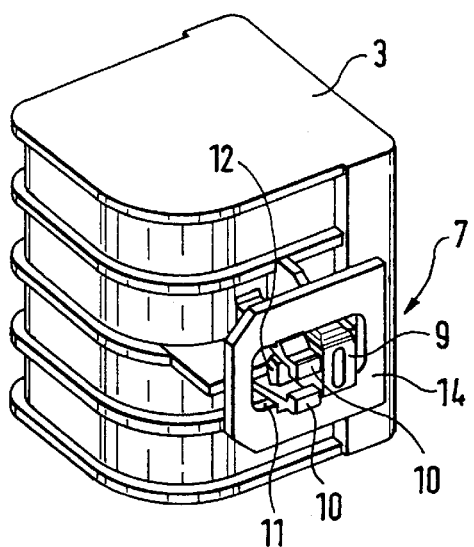
FIG. 2 is an enlarged representation of a portion of one coolant tank of the cooler according to FIG. 1 in the area of a detent arrangement constructed as a movable bearing.
Figure 3:
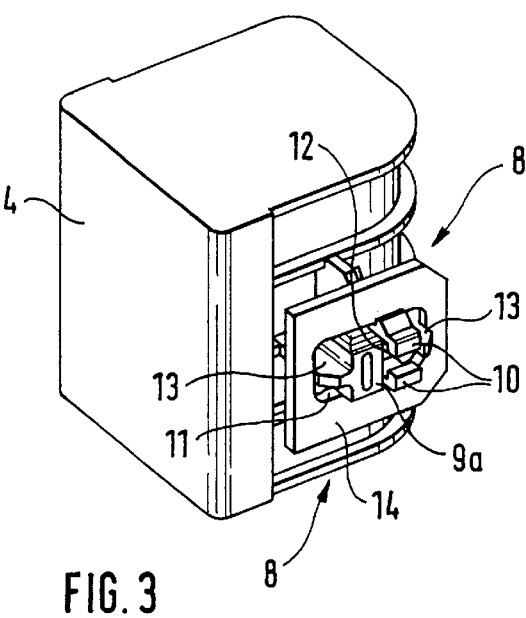
FIG. 3 is a view of another detent arrangement on the opposite coolant tank of the cooler according to FIG. 1, which detent arrangement is constructed as a fixed bearing.

For creating the movable bearing function of the fastening point 7, the detent recess 11 is constructed to be longer in the transverse direction than the joint length of the detent arrangement 10, 12 and of the support body 9 so that, relative to the support body 9 and the detent arrangement 10, 12—with respect to the representation according to FIGS. 1 to 3—the fastening lug 14 is horizontally slidable. For creating the fixed bearing function in the case of the opposite fastening point 8 on the other coolant tank 4, two filler webs 13 project on both sides, on the one hand, from the support body 9a and, on the other hand, from the detent arrangement 10, 12 toward the outside, both filler webs 13 each being shaped in one piece onto the coolant tank 4. The filler webs 13 are dimensioned such that the whole width of the fastening point 8 corresponds approximately to the corresponding length of the detent recess 11 so that the fastening lug 14 is held in the transverse direction as well as in the vertical direction essentially without play by the support body 9a as well as by the filler webs 13.

The detent arrangements have an identical construction on the movable bearing side as well as on the fixed bearing side. Each detent arrangement has a pair of detent hooks 10 which, within certain limits, has an elastically resilient construction in the vertical direction—relative to the representation according to FIGS. 1 to 3. Both detent hooks of the pair of detent hooks 10 each have a detent nose which projects upwards and downwards and, in the mounted condition, reaches behind the upper and the lower edge of the assigned detent recess 11 of the fastening lug 14. As easily recognizable in FIGS. 5a to 5c, a center web 12 is provided between the two detent hooks of the pair of detent hooks 10 and is used as a stop and as a support and, on its free end, has a hammer head projecting to the two detent hooks 10. This center web 12 is used for bounding the deflecting of the detent hooks 10 toward the center and thus prevent an excessive bending of one or the other detent hook 10 during the mounting. The center web 10 has a stable and rigid construction and, in addition to its support of the detent hooks 10, also ensures a uniform and centered introduction of the detent hooks 10 into the detent recess 11, as clearly illustrated by means of FIGS. 5a to 5c. The width of the hammer head of the center web 12 is adapted such to the detent hooks 10 as well as their pertaining detent noses that, when the detent hooks 10 are slid into the detent recess 11, they simultaneously come to rest on the hammer head, in which case the mutual spacing of the points of the detent noses corresponds almost exactly to the corresponding course of the detent recess 11. Since simultaneously also the respective support body 9, 9a is inserted into the detent recess, a precise mounting is permitted which excludes any faulty mounting. In the mounted position according to FIG. 5c, the detent noses of the detent hooks 10 reach behind the edges of the detent recess 11.

The embodiment according to FIGS. 6 and 7, which is illustrated only schematically, essentially corresponds to the above-described embodiment according to FIGS. 1 to 5c. The difference in this embodiment is the improved construction of the two detent arrangements of the fastening point 7a used as the movable bearing, on the one hand, and of the fastening point 8a designed as the fixed bearing, on the other hand. Elastically resilient support-tongues 19 are in each case assigned to the two detent hooks of the pair of detent hooks 10 transversely to the detent hooks 10. These support tongues 19 compensate tolerances of the detent connection and permit a play-free seat of the fastening lugs 14 on the detent hooks 10. These support tongues 19 are pressed from their unloaded inoperative position according to FIG. 6 downward when the fastening lugs 14 are placed and remain in this prestressed position as soon as the detent noses of the detent hooks 10 reach behind the fastening lug 14. As a result, the support tongues 19 exercise a spring force from below onto the fastening lugs 14 by means of which these are pressed against the detent noses. In this manner, a play-free and therefore rattle-free fastening is achieved. In addition, the prestressing of the support tongues 19 permits an improved demounting of the heat exchangers since, after the detaching of the detent hooks, the fastening lugs 14 are pressed away from the detent arrangements by the support tongues.

In the embodiment according to FIGS. 8 to 11, the detent arrangements and the force transducing devices are separated from one another in a manner described in detail in the following. The lower fastening is also constructed as a plug-type holding device so that reference is made for this purpose to the description of the preceding embodiments. In the area of the upper fastening side, the heat exchanger, which preferably is also constructed as a condenser, has one fastening lug 20 respectively for each fastening point 8b for the fastening on the opposite coolant tanks 4b. These fastening lugs 20 are rigidly arranged on the collecting tanks of the condenser. For receiving two mutually spaced detent hooks 17, the two fastening lugs 20 have two detent recesses 22. Between the two detent recesses 22, a circular recess is provided in each fastening lug 20 and is used as a support recess 21 for the play-free receiving of a cone-type support body 15, 16. A support web 18 is assigned to each detent hook 17 and forms a stop for the respective detent hook 17 in order to prevent an excessive bending of the detent hook 17 during the mounting. The support web 18 also projects into the corresponding detent recess 22, which results in an additional form closure. The support webs 18 are constructed to be rigid and stable. As in the preceding embodiments, all elements of the detent arrangements as well as of the force transducing devices are shaped in one piece to the respective coolant tank 4b. Also, analogously to the embodiment according to FIG. 6, one elastically resilient support tongue 19 is assigned to each detent hook 17.

The support body 15 has a centering point 16 which tapers very conically in order to permit a simplified introduction of the support body 15 into the corresponding support recess 21 during the mounting of the two heat exchangers.

Figure 10:
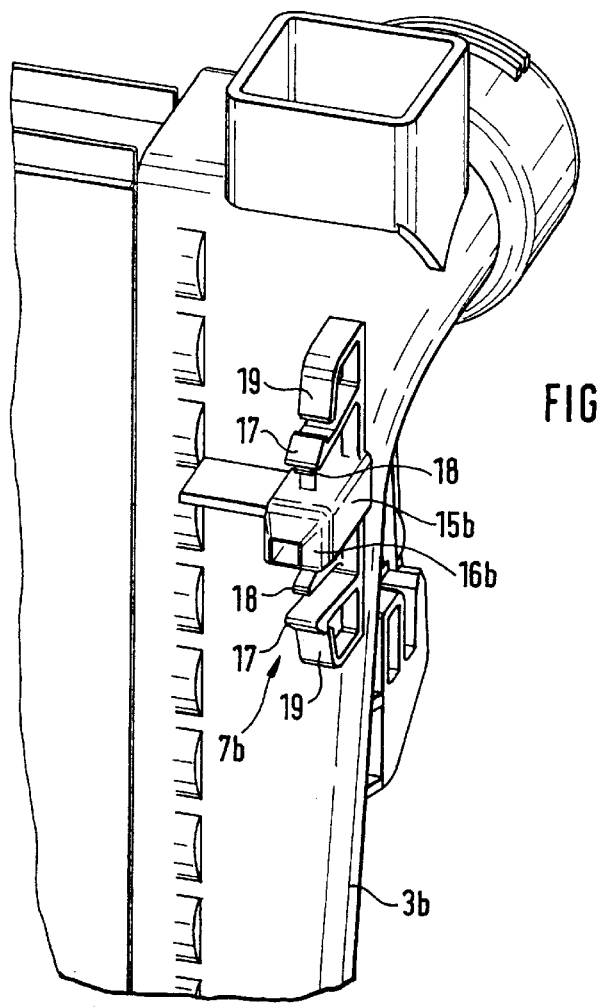
FIG. 10 is a view of the detent arrangement which is situated opposite the detent arrangement according to FIG. 8 and 9 and is constructed as a movable bearing.
Figure 11:
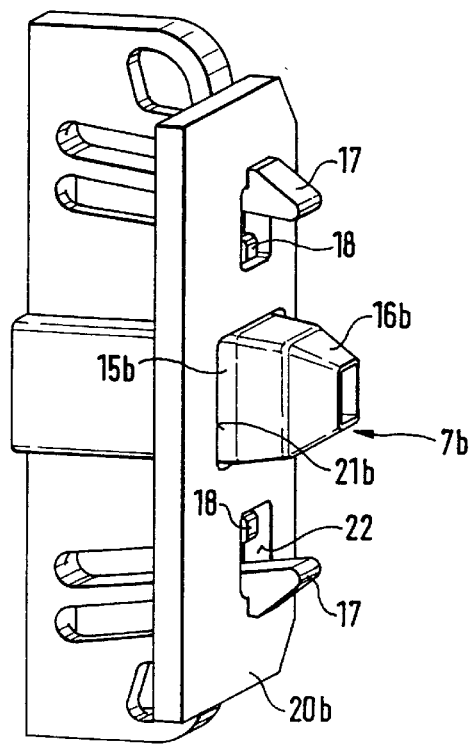
FIG. 11 is an enlarged perspective representation of the detent arrangement according to FIG. 10.

In the case of the fastening point 7b according to FIGS. 10 and 11 which defines the movable bearing side, the detent arrangement, including the detent hooks 17, the support webs 18, the support tongues 19 and the detent recesses 22 has an identical construction so that reference is made to the previous description.

However, in the case of this movable bearing side, the support body 15b is constructed as a parallelepiped filler body which tapers in the direction of its free end in the manner of a truncated pyramid, the centering point 16b in particular having the shape of a truncated pyramid. The corresponding support recess 21b has a rectangular design and has dimensions which permit a mobility of the fastening lug 20b in two degrees of freedom—in the case, of the illustrated embodiment, horizontally. The detent recesses 22 have a correspondingly wider design in order to not block the horizontal mobility in the area of the support body 15b.

For fastening the condenser to the cooler, in all described embodiments, the condenser is first inserted diagonally into the plug-type holding device and is then swivelled toward the cooler also with its top side, whereby the detent arrangements cause the locking of the condenser. When the condenser is swivelled toward the cooler, a tilting of the lower area of the condenser takes place within certain limits in the area of the support flanges above the plug-type holding device, whereby the underside of the condenser is forced to the outside and comes to rest on the support hooks of the plug-type holding device. In the mounted condition, that is, in the locked condition of the condenser, the underside of the condenser is therefore under tension in the area of the plug-type holding device, whereby the play-free fastening in the area of the plug-type holding device is achieved.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Heat exchanger arrangement having two heat exchangers which can be detachably connected with one another on opposite fastening sides by means of a fastening arrangement, the fastening arrangement on one fastening side having a plug-type holding device which has hook-type profiles, wherein the fastening arrangement on the other fastening side has a detenit connection which is divided into a detent arrangement constructed as a movable bearing and into a detent arrangement constructed as a fixed bearing.

2. Heat exchanger arrangement according to claim 1, wherein a force transducing device is assigned to each detent arrangement, which force transducing device has a support body arranged on one heat exchanger as well as at least one support web which is arranged on the other heat exchanger and at least partially reaches around the support body in the mounted condition of the heat exchangers.

3. Heat exchanger arrangement according to claim 2, wherein each detent arrangement has an elastically resilient pair of detent hooks on one heat exchanger as well as at least one corresponding detent recess on the other heat exchanger, the detent hooks of each pair of detent hooks reaching behind the edges of the at least one detent recess in the mounted condition.

4. Heat exchanger arrangement according to claim 3, wherein in each case at least one stop web which acts as a support is provided between the detent hooks of each pair of detent hooks for limiting the deflecting capability of the detent hooks.

5. Heat exchanger arrangement according to claim 1, wherein the plug-type holding device as well as the detent connection are positioned in an area of opposite collecting tanks of one heat exchanger.

6. Heat exchanger arrangement according to claim 5, wherein the collecting tanks are made of plastic, and wherein the portions of the plug-type holding device as well as of the detent connection assigned to the collecting tanks of the heat exchanger are shaped in one piece with the collecting tanks.

7. Heat exchanger arrangement according to claim 2, wherein the detent arrangements and the assigned force transducing devices are arranged adjacent to one another, and wherein the edges of the detent recesses are constructed in a supplementary manner as support webs of the force transducing devices.

8. Heat exchanger arrangement according to claim 2, wherein the support webs are formed by edges of support recesses, and wherein the detent recesses and the support recesses are provided in a mutually spaced manner for each detent arrangement in a common holding plate.

9. Heat exchanger arrangement according to claim 2, wherein the support bodies are provided with tapering centering points.

10. Heat exchanger arrangement according to claim 9, wherein the support body for the fixed bearing has a circular cross-section, and wherein the support recess which reaches around the support body also has a circular construction.

11. Heat exchanger arrangement according to claim 9, wherein the support body for the movable bearing has a rectangular cross-section, and wherein the corresponding support recess also has a rectangular cross-section, the sides of the support recess extending in parallel to the connection axis between the fixed bearing and the movable bearing having a longer construction than the flanked lateral surfaces of the support body.

12. Heat exchangers arrangement according to claim 3, wherein the detent arrangements and the assigned force transducing devices are arranged adjacent to one another, and wherein the edges of the detent recesses are constructed in a supplementary manner as support webs of the force transducing devices.

13. Heat exchanger arrangement according to claim 3, wherein the support webs are formed by edges of support recesses, and wherein the detent recesses and the support recesses are provided in a mutually spaced manner for each detent arrangement in a common holding plate.

14. Heat exchanger arrangement according to claim 3, wherein the support bodies are provided with tapering centering points.

15. Heat exchanger assembly comprising:

a first heat exchanger, a second heat exchanger, and a fastening arrangement detachably fastening the first and second heat exchangers together, said fastening arrangement including:

a plug-type holding device at one fastening side of the first and second heat exchangers, and first and second detent connections at another fastening side of the first and second heat exchangers, wherein said first detent connection is configured as a movable bearing permitting relative adjusting movement of the first and second heat exchangers, and wherein the second detent connection is configured as a fixed bearing.

16. A method of making a heat exchanger assembly comprising:

providing a first heat exchanger, providing a second heat exchanger, and detachably fastening the first and second heat exchangers together using a fastening arrangement, said fastening arrangement including:

a plug-type holding device at one fastening side of the first and second heat exchangers, and first and second detent connections at another fastening side of the first and second heat exchangers, wherein said first detent connection is configured as a movable bearing permitting relative adjusting movement of the first and second heat exchangers, and wherein the second detent connection is configured as a fixed bearing.

* * * * *